Feb. 2, 1965   S. T. WILLIAMS   3,168,012
FLUID PRESSURE RESPONSIVE ACTUATOR
Filed Nov. 7, 1962   2 Sheets-Sheet 1

INVENTOR
Selden T. Williams
BY
H. F. Johnston
ATTORNEY

Feb. 2, 1965 S. T. WILLIAMS 3,168,012
FLUID PRESSURE RESPONSIVE ACTUATOR
Filed Nov. 7, 1962 2 Sheets-Sheet 2

INVENTOR
Selden T. Williams
BY
H. F. Johnston
ATTORNEY

United States Patent Office 3,168,012
Patented Feb. 2, 1965

3,168,012
FLUID PRESSURE RESPONSIVE ACTUATOR
Selden T. Williams, Middlebury, Conn., assignor to Scovill Manufacturing Company, Waterbury, Conn., a corporation of Connecticut
Filed Nov. 7, 1962, Ser. No. 236,078
5 Claims. (Cl. 92—90)

This invention relates to fluid pressure responsive actuators, and more particularly to a device for moving a pin or another element in response to changes in fluid pressure inside a hollow chamber or the like. The present invention is an improvement on the device disclosed in my prior Patent 3,045,704 dated July 24, 1962.

The invention is intended to provide a device which can displace in many instances piston and cylinder actuators, spring-loaded diaphragms and bellows arrangements. In addition to the expense of these prior devices, they have many other faults. In the case of a piston and cylinder, there is the problem of a seal around the piston itself and a stuffing box around the pin or rod which is moved by the piston. In the case of diaphragms or bellows, there is the danger of breakage resulting in leakage and in many instances, the necessity to provide levers and the like for multiplying the small movement of the actuating element. In all cases, there is the problem of friction, particularly if the device remains inactive over a long period of time, and since my invention overcomes this problem, it is particularly well-suited to applications where the range of pressure variations is comparatively small.

In another aspect, the invention is an improvement over my prior patent in the provision of a fluid pressure responsive actuator for moving a pin extending to the exterior of the pressure chamber, which will require no seal such as a stuffing box around the pin and also, wherein such pin will be adequately guided throughout its range of movement.

Another object is to provide better efficiency wherein more of the volumetric change of the elastomeric material is utilized in the direction desired on the actuator pin. To this end, the present invention utilizes a plurality of superimposed bodies or layers, preferably in the shape of spools or discs of elastomeric material, each consisting of a multiplicity of integrally united elastically walled and hermetically closed gas-containing cells which are permanently united together by means which at least partially immobilizes the material at the interfaces of such layers. One advantage of this arrangement over the device of my above-mentioned patent is to make the movement of the actuated element a more nearly linear function of the pressure changes.

For any given application, the designer may select the suitable type of elastomeric material from the various foam rubbers and foam plastics which may now or in the future be available. They may vary in cell size, thickness of cell walls or relative elasticity of the walls. In some cases, the material may even be pre-pressurized. In other cases, different layers or sections may be graduated in their fluid pressure responsive characteristics so that some will react more quickly to small pressure changes while others will require larger pressure changes for a similar reaction or movement.

Other objects of my invention are to provide an improved fluid pressure actuator of the kind described in which friction is eliminated or reduced to a minimum, resulting in little or no wear and therefore, greater durability; to avoid the necessity of using a lubricant; and to provide such a device which can be manufactured at a comparatively low cost.

Other objects and advantages of the invention will hereinafter more fully appear.

In the accompanying drawings, I have shown for purpose of illustration, three embodiments which the invention may assume in practice. In these drawings.

Figure 1:
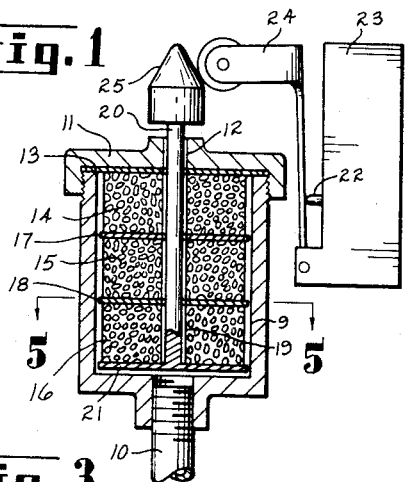
FIG. 1 is a central vertical section of a pressure-actuated switch in depressurized condition.

In FIG. 1, there is shown a hollow cylindrical chamber 9 which is subject to variable fluid pressure through a connection 10 at one end. The wall at the upper end is in the form of a removable cap 11 which has a central hole 12 extending through it. There may be a sealing disc 13 interposed between the cap and the upper edge of the cylindrical wall of the chamber 9, and the uppermost body or layer 14 of foam material is bonded to said disc 13 as by having one surface which extends entirely across said body in a direction normal to the hole 12 adhesively secured thereto throughout the entire area of such surface. Any desired number of such layers may be superimposed one on the other and three such layers 14, 15 and 16 are employed in the devices of FIGS. 1 and 2. The various layers are separated by discs 17 and 18 which are bonded as by adhesive material to the adjacent faces of the layers of foam material. These adjacent faces extend entirely across the layers in a direction normal to the axis of the chamber and are permanently united throughout their entire areas. In most instances, these discs are preferably of rigid material, such as metal or plastic, but in some cases, a more flexible uniting means may be employed which is relatively inextensible as compared to the main body of foam material itself.

A central vertical hole 19 extends through the layers 14, 15 and 16, as well as the discs 17 and 18, and this hole 19 is in alignment with the hole 12 in the top wall of the chamber.

Figure 2:
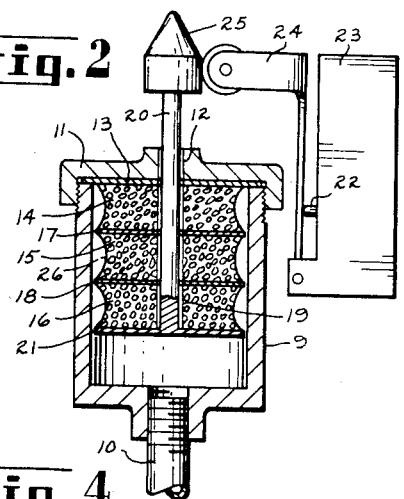
FIG. 2 is a similar view in pressurized condition.

A movable actuator pin 20 is joined to the bottom surface of the lower layer 16, preferably by a rigid disc 21 adhesively secured to the bottom layer 16, and the actuator pin 20 extends upwardly through holes 19 and 12 to the exterior of the chamber. Suitable means can be attached to the outer end of the pin 20 for operating any desired device, such as a gauge, valve or switch. In FIGS. 1 and 2, I have indicated a switch pin 22 mounted on the switch 23, and the pin 20 is engaged by a lever 24 which is moved back and forth by a cam 25 mounted on the end of pin 20.

FIG. 1 shows the bodies at rest when there is no pressure in the chamber 9, but where pressure builds up as shown in FIG. 2, the bodies of foam material will contract in proportion to the increase in pressure so as to lift the disc 21, the actuator pin 20, and cam 25 to operate the switch pin 22. While the layers of foam material will shrink slightly in diameter as indicated by the curved lines 26, the principal volumetric change will occur in the vertical direction since the layers are immobilized at the interfaces. This results in a substantially greater and more reliable movement than the case where there would be a single body of foam material of the same size as the three shown.

It will be noted that the pin 20 fits freely in the openings 19 and 12 and no seal around the pin is required, and thus, there is no friction. At the same time, the bottom disc 21 is freely guided inside the hollow chamber so that the pin is effectively guided on its upper and lower ends.

Figure 3:
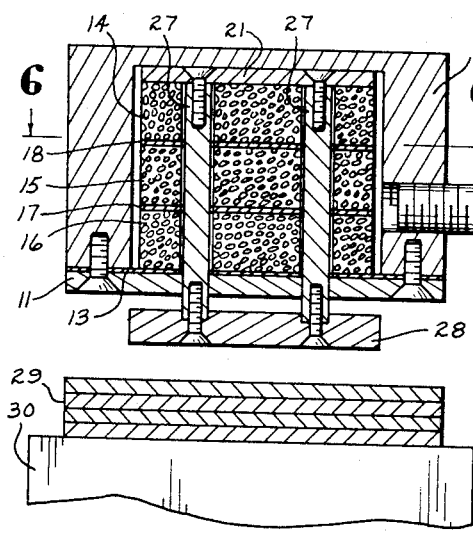
FIGS. 3 and 4 are central sections through a clamping device in depressurized and pressurized positions.
Figure 4:
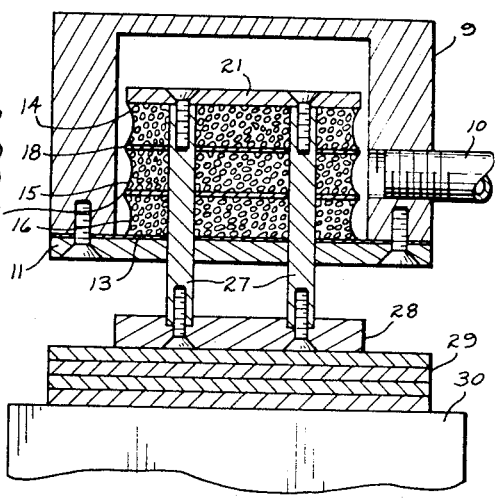
Figure 6:
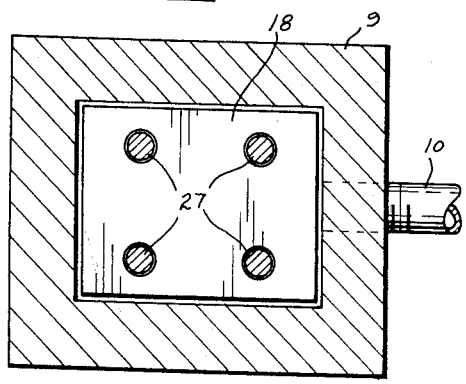
FIG. 6 is a cross-section on line 6—6 of FIG. 3.
Figure 5:
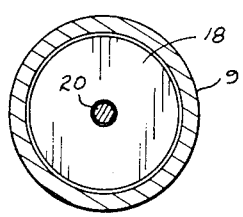
FIG. 5 is a cross-section on line 5—5 of FIG. 1.

FIGS. 3 and 4 show the application of the invention to a clamping device. The chamber, removable end wall, and layers of foam material are given numbers which correspond to the same parts in the devices of FIGS. 1 and 2. In this case, however, there is preferably employed a plurality of actuator pins 27, herein shown as four in number, and these pins extend through the end wall 11 to connect with a pressure pad or clamping plate 28. FIG. 3 shows the bodies where there is no pressure in the chamber 9, and FIG. 4 shows what happens when substantial pressure is introduced. The layers 14, 15 and 16 of foam material will shrink and force the pins 27 outwardly of the wall so as to push the clamping plate 28 downwardly to compress or clamp any work piece, such as indicated by the numeral 29, against a stationary base 30. Obviously, such a device may be made in any desired size and for any desired area of the clamping plate. While the clamping force is substantially equal to that of a piston of the same cross-sectional area, it will have considerable advantages over a piston and cylinder arrangement because it is more economical to construction and more trouble-free because there is substantially nothing to wear or any friction to be overcome.

Figure 7:
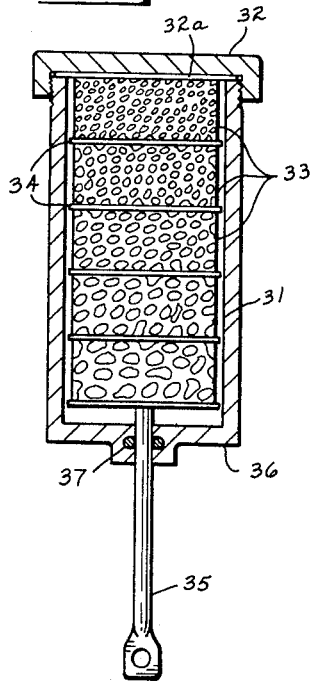
FIGS. 7 and 8 are central vertical sections showing in depressurized and pressurized positions another form of the actuator suitable for various mechanical applications.
Figure 8:
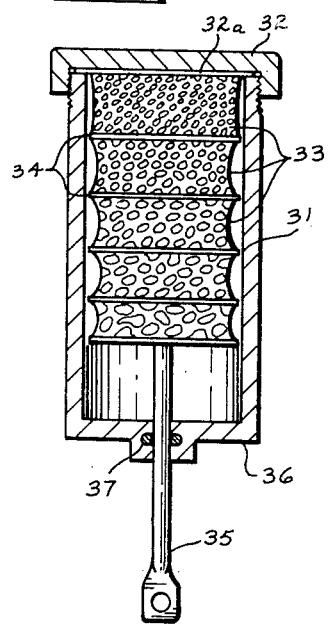

The form of devices shown in FIGS. 7 and 8 while not possessing all of the advantages of other forms, does show how the multi-layer principles can be used where it is desired to pull an actuator pin or rod upon increase of fluid pressure in the chamber. Here the hollow chamber is indicated at 31 as being substantially longer than its diameter and having a removable end cap 32. A sealing disc 32a may be interposed between the end cap 32 and the end of the chamber 31, and to which disc the uppermost of a series of layers 33 of foam material may be adhesively secured. The various layers may be connected at their interfaces by discs 34 similar to those already described, and to the bottom end of the lower disc is attached the actuator pin 35 extending through a hole in the bottom end wall 36 of the chamber. In this case, it is necessary to provide a stuffing box or seal 37 around the pin. The chamber 31 is, of course, subjected to variable fluid pressure through a connection (not shown) and as pressure builds up, the layers of material 33 will shrink in volume as shown in FIG. 8 to operate the pin 35. In this case, there is indicated the principle of different pressure responsive characteristics of the various layers of foam material. By using foam materials having varying pressure-volume characteristics for the successive layers composing the actuator shown in FIG. 8, the overall pressure response pattern of the device may be considerably modified. For example, if the successive layers making up this actuator are shown from foam materials having progressively lower co-efficients of volumetric change per unit increment of pressure, each layer will successively contract through the major portion of its height reduction as the pressure rises. This will result in a total change in length of the unit much more nearly linear over the whole pressure range.

With the proper selection of different materials, the movement of the actuator pin can be made to approach very closely a linear function of the increase in pressure. One disc will operate for this purpose during the lower pressure; another during a slightly higher range and others in the increasing ranges so that as the pressure builds up to the point where one disc will lose its proper functions, others will take over.

What I claim is:
1. A fluid pressure responsive actuator comprising
   (a) a hollow chamber having a hole through one wall thereof;
   (b) a body of elastomeric material consisting of a multiplicity of integrally united elastically walled and hermetically closed gas-containing cells, said body having a hole therethrough in line with said hole in the chamber wall;
   (c) means for securing said body inside said chamber with one surface which extends entirely across said body in a direction normal to the hole in said body, being adhesively attached throughout, to the inner surface of said chamber wall around said first hole;
   (d) an actuator pin attached to that surface of said body opposite said one surface and extending through said hole to the exterior of said chamber; and
   (e) a connection to said chamber for admitting pressure fluid to or exhausting it from said chamber.
2. A fluid pressure responsive actuator comprising
   (a) a hollow cylindrical chamber whose interior is subjected to variable fluid pressures and one wall of which has a hole therethrough;
   (b) an actuator element having a plurality of superimposed layers of elastomeric material each consisting of a multiplicity of integrally united elastically walled and hermetically sealed gas-containing cells;
   (c) means for permanently uniting throughout their entire areas the adjacent faces of said layers, said faces extending entirely across said layers in a direction normal to the axis of said chamber, said uniting means being relatively inextensible so as substantially to immobilize the cells of elastomeric material along their adjacent faces;
   (d) means for attaching said actuator element to one of the end walls of said hollow chamber and an actuator pin attached to the other end of said actuator element and extending through said hole to the exterior of said chamber, said attaching means being independent of that portion of said pin which extends beyond said hole; and
   (e) a connection to said chamber for admitting pressure fluid to or exhausting it from said chamber.
3. A fluid pressure responsive actuator as defined in claim 2 wherein the means for uniting the adjacent faces of said layers of elastomeric material consist of discs of rigid material located between the adjacent faces of said layers and bonded thereto.
4. A fluid pressure responsive actuator as defined in claim 2 wherein there is a hole extending through said layers of elastomeric material and through said uniting means, which hole is in alignment with said hole in the chamber wall and wherein one of the outer layers is bonded to the chamber wall around said hole and wherein said actuator pin is attached to the outer face of the opposite end layer and extends through said aligned holes to the exterior of said chamber.
5. A fluid pressure responsive actuator as defined in claim 2 wherein the superimposed layers of elastomeric material have different pressure responsive characteristics.

References Cited by the Examiner
UNITED STATES PATENTS

| 82,276 | 9/68 | Belleville | 92—46 |
| 2,324,173 | 7/43 | Porter | 92—46 |
| 3,045,704 | 7/62 | Williams | 92—90 |

RICHARD B. WILKINSON, *Primary Examiner.*

FRED E. ENGELTHALER, *Examiner.*